May 4, 1954  G. J. BRYAN  2,677,363
STOVE FOR ICE FISHING
Filed July 5, 1949  2 Sheets-Sheet 1
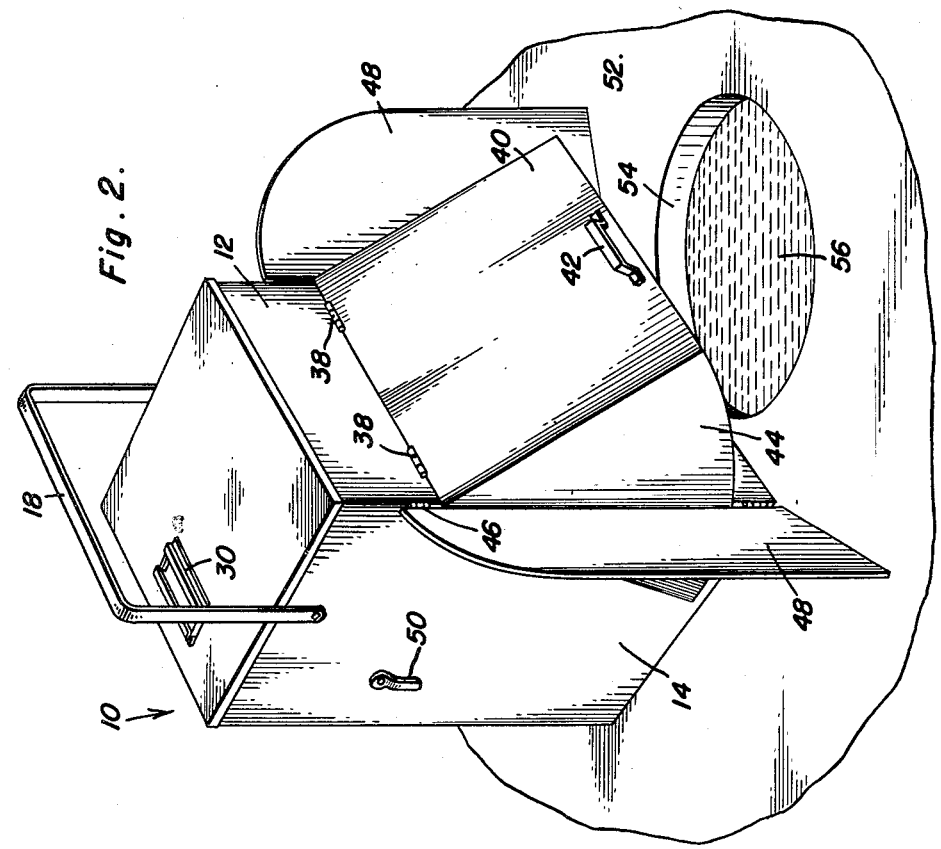
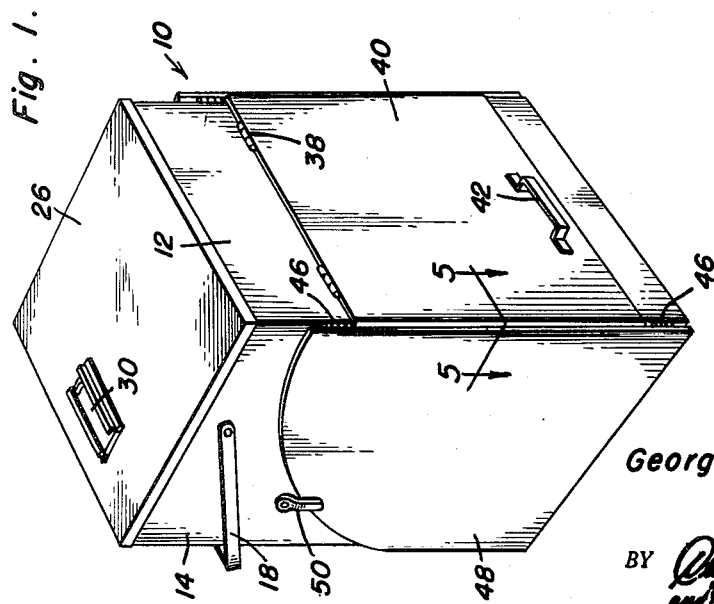
George J. Bryan
INVENTOR.

May 4, 1954  G. J. BRYAN  2,677,363
STOVE FOR ICE FISHING
Filed July 5, 1949   2 Sheets-Sheet 2
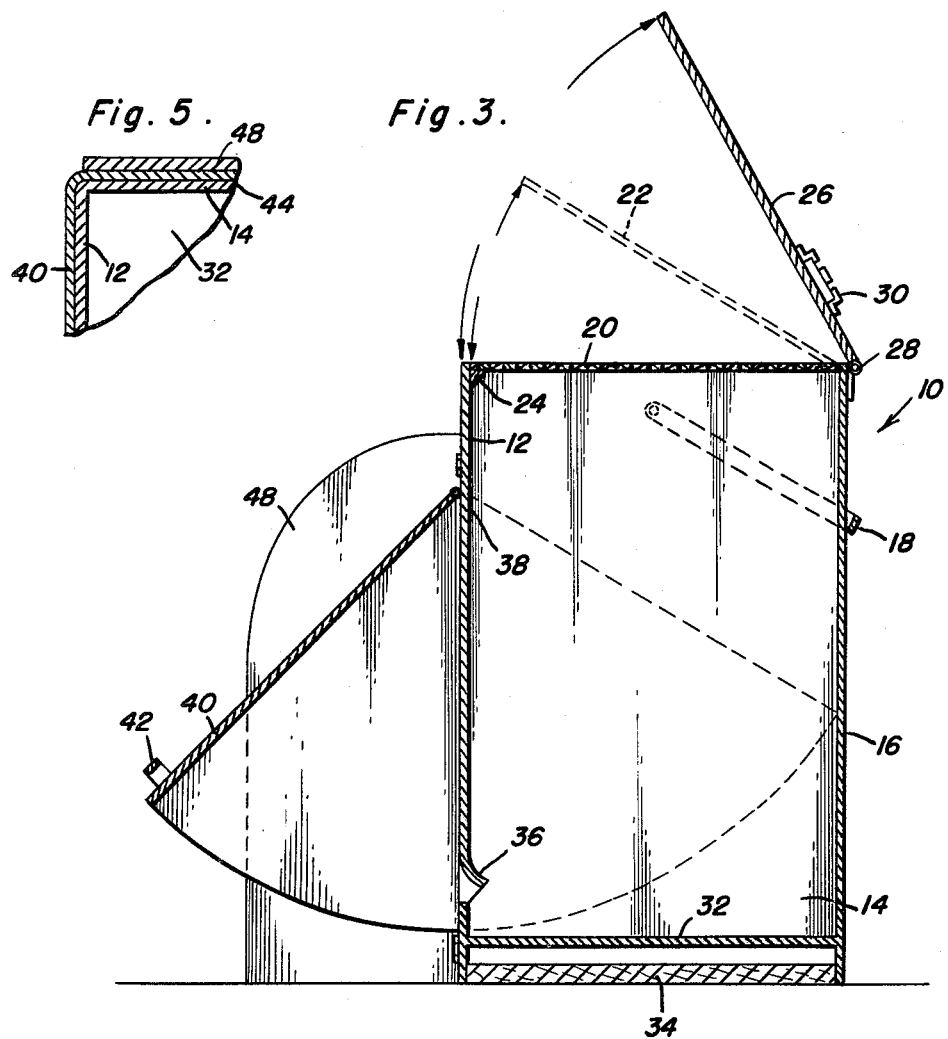
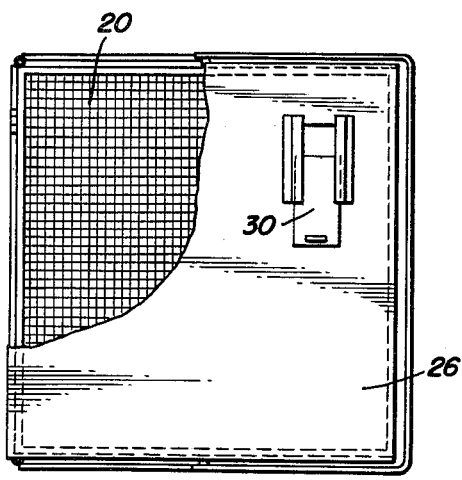
George J. Bryan
INVENTOR.

Patented May 4, 1954

2,677,363

UNITED STATES PATENT OFFICE 2,677,363

STOVE FOR ICE FISHING

George J. Bryan, Minneapolis, Minn.

Application July 5, 1949, Serial No. 103,047

2 Claims. (Cl. 126—4)

This invention comprises novel and useful improvements in a stove for ice fishing and more specifically pertains to a portable stove suitable for preventing the formation of ice over ice holes in sub zero temperature for fishing.

The principal object of this invention is to provide a portable stove which is peculiarly and efficiently adapted for maintaining ice holes free of ice in sub zero temperature to facilitate fishing therein, and which is capable of protecting and heating a given area adjacent the stove.

A further object of the invention is to provide a portable stove in conformity with the foregoing object which may be compactly folded for storage or transportation and which may be readily assembled into operative position for directing heat from the stove to a given area, for shielding said area against wind and the like.

A further important object of the invention is to provide a portable stove according to the preceding objects in which provision is made for using the top portion of the stove for cooking, heating and the like.

These, together with various ancillary features and objects of the invention which will later become apparent as the following description proceeds, are attained by the present device, a preferred embodiment of which has been illustrated by way of example only in the accompanying drawings, wherein:

Figure 1 is a perspective view of a suitable embodiment of a stove in accordance with this invention, the stove being shown in its collapsed position for ready transportation of the same;

Figure 2 is a perspective view showing the stove in its erect position ready for use and in proximity to a fishing hole in the ice;

Figure 3 is a vertical longitudinal sectional view through the stove of Figure 2, the top of the stove being shown in its open position, and a grill being shown in its closed position, an alternative open position being indicated in dotted lines therein;

Figure 4 is a top plan view, a portion of the top being broken away; and,

Figure 5 is a horizontal sectional detail view taken substantially upon the plane of the section line 5—5 of Figure 1.

Referring now more specifically to the accompanying drawings, wherein like numerals designate similar parts throughout the various views, it will be seen that the numeral 10 designates generally the improved stove forming the subject of this invention and which may conveniently be formed of sheet metal or other inexpensive material as desired. The stove includes a front wall 12, a pair of oppositely disposed side walls 14 and a back wall 16, the opposite side walls being provided with a handle or bail 18 pivoted thereto in a conventional and well known manner.

Hinged to the open upper end of the stove housing is a grill or screen 20 of any suitable material, shown in its closed or lowered position in full lines in Figure 3 and indicated in Figure 3 at 22 in dotted lines in its open position whereby access may be had to the interior of the housing which forms the combustion chamber of the stove.

Secured inside the housing and at the upper inner surface of the front wall 12 thereof, is a transversely disposed support 24 which may conveniently be in the form of an angle iron member and constitutes a rest for the end of the grill 20 when the latter is in its lowered position. Likewise hinged to the upper end of the housing is a cover or closure 26, which together with the grill 20 may be hinged as by hinges 28 to the back wall 16 of the housing of the stove. As will be readily apparent from Figure 3, the cover 26 may be raised as desired and likewise the grill 20 may be raised in order to obtain access to the combustion chamber within the housing, or may be closed whereby food may be placed upon the grill for heating or cooking the same.

A sliding damper 30 which may conveniently be in the form of a plate covering an opening in the top 26 which plate is slidable between a pair of flanged retaining members as shown in Figures 3 and 4, is provided and constitutes a damper for controlling the draft of the stove as well as regulating the vent for combustion products through the cover of the same.

The bottom of the combustion chamber is formed by a bottom wall 32 which is secured to the opposite side walls, the front and rear wall of the housing and spaced above the lower ends thereof. This bottom wall 32 may conveniently be integrally formed with these walls, or may be separately attached and secured thereto in any desired manner. As will now be apparent, the bottom wall 32 is adapted to support a fire which may be of charcoal or any other suitable combustibles, this fire being received within the combustion chamber formed by the front and rear walls, and their two opposite side walls. Preferably the housing of the stove is provided with a base 34 which may be of wood or any other suitable material and which is received within the lower extremities of the front and rear walls and the opposite side walls. The base 34 constitutes a means for protecting the surface on which the stove rests from the heat of the combustion chamber as transmitted by the bottom wall 32. If desired, the base 34 could be above a heat insulating material to more effectively carry out this purpose.

The front wall 12 adjacent the lower end thereof is provided with an inwardly extending opening 36 which constitutes a draft for directing air to the bottom of the combustion chamber within the stove. As will be seen from Figure 3, the inlet opening is in the form of a downwardly directed spout which forms a downwardly inclined deflector at the top of the inlet opening thus directing the incoming air to the stove bottom wall 32 and thus to the bottom of the fire to be retained therein. Preferably, the opening 36 constitutes an air inlet means of a fixed area, although draft adjusting means could be provided for this opening of any desired character if desired.

Secured by horizontally disposed hinges 38 to the front wall 12 in any convenient place below the upper surface thereof, is a hood consisting of a panel 40 which is inclined downwardly and is provided with the handle 42 by means of which the same may be pivoted in a vertical plane. The hood extends across the entire width of the front wall 12, and in its closed position as shown in Figure 1 terminates closely adjacent the lower end of the stove and in a position to completely overlap the area of opening 36 for closing the same. At its sides, the top panel 40 of the hood is provided with parallel, perpendicularly and rearwardly extending projections forming guards or shields 44 which are slidably received against the opposite side walls 14 of the stove in sliding embracing engagement therewith. This relation is further shown in the detailed view of Figure 5. It is thus seen that the hood 40 may be in its fully closed position as shown in Figure 1 whereby the same will compactly lay against the front wall of the stove and close the air inlet opening of the same, with the side guards or shields, the side walls 44 particularly forming guides sliding against the opposite side walls 14.

By means of vertically disposed hinges 46 on the opposite edges of the front wall 12, a pair of guards or shields 48 of any desired shape are pivotally mounted, these shields being mounted in a position to fold backwardly against the sides and thus enclose and conceal the side walls 44 of the hood 40, as shown in Figure 1, or to be selectively moved forward to extend outwardly from the front wall 12 in the form of wings and thereby constitute guards or shields as set forth hereinafter and shown in Figure 2. Suitable pivoted latch or retaining members 50 may be mounted upon the opposite side walls 14 for engagement with the guards 48 for retaining the same in their folded position as shown in Figure 1.

The principal operation of the stove is indicated in Figure 2 wherein the same is shown in its erected or assembled position and mounted upon the surface of a lake or the like, which has an ice coating indicated at 52 in which is formed an ice hole 54 whereby access may be had to the water 56 therebeneath for fishing or the like. With the stove in the position of Figure 2, and a fire burning in the combustion chamber of the same, the hood 40 forms a heat deflector or shield which directs heat of combustion from the stove downwardly towards the ice hole 54. This heat thus directed prevents the formation of ice upon the water 56 so that the ice hole is kept open enabling the user to readily fish in sub zero temperatures. In this position, the guards or shields 48 serve as windbreaks for preventing the wind from striking the ice hole 56 as well as preventing the wind blowing up under the hood 40 from the sides thereof, and thus interfere with the normal draft under the hood through the inlet opening 36.

Obviously, the user by raising the cover 26 may obtain access to the grill 20 for heating coffee, warming sandwiches, cooking or the like, and may raise the grill 20 to its dotted line position 22 in Figure 3 to obtain access to the combustion chamber within the housing.

By this apparatus, the major difficulty of fishing through ice holes in sub zero temperatures, namely the interference of the ice forming upon the water in the hole with the operation of a fishing line is thus readily eliminated.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A portable stove comprising a housing forming a combustion chamber having front, side and bottom walls, respectively, and a top, said front wall being provided with an air inlet opening adjacent the bottom wall for admitting combustion supporting air into said chamber, a downwardly opening hood having a top wall and side guards, the top wall having an upper edge hinged to said front wall adjacent said top for swinging of said top wall vertically toward said front wall to close said opening and away from said front wall so that said hood forms a heat deflector for deflecting heat transferred through said front wall downwardly and outwardly of said housing, said side guards slidably embracing said side walls to close the sides of the hood when said top wall is swung away from said front wall, said front wall having a portion directed downwardly and inwardly of said chamber to form the air inlet opening and a downwardly inclining deflector at the top of said opening.

2. A portable stove comprising a housing forming a combustion chamber having front, side and bottom walls, respectively, and a top, said front wall being provided with an air inlet opening adjacent the bottom wall for admitting combustion supporting air into said chamber, a downwardly opening hood having a top wall and side guards, the top wall having an upper edge hinged to said front wall adjacent said top for swinging of said top wall vertically toward said front wall to close said opening and away from said front wall so that said hood forms a heat deflector for deflecting heat transferred through said front wall downwardly and outwardly of said housing, said side guards slidably embracing said side walls to close the sides of the hood when said top wall is swung away from said front wall, and a pair of vertical side shields having side edges hinged to said side walls for swinging of said shields forwardly of said housing against said side guards to fend wind away from the sides of said hood, said side guards sliding between said side walls and the hinged side edges of said shields for guided sliding movement.

References Cited in the file of this patent

UNITED STATES PATENTS

| Number | Name | Date |
|---|---|---|
| 90,630 | Beckwith | June 1, 1869 |
| 716,501 | Watson | Dec. 23, 1902 |
| 1,118,537 | Dodds | Nov. 24, 1914 |
| 1,198,693 | Bond | Sept. 19, 1916 |
| 1,209,610 | Muehleisen | Dec. 19, 1916 |
| 1,222,325 | Robertson | Apr. 10, 1917 |
| 1,455,551 | Ryan | May 15, 1923 |
| 1,491,080 | Clark | Apr. 22, 1924 |
| 1,633,707 | Miller | June 28, 1927 |
| 1,870,600 | Bernstein | Aug. 9, 1932 |
| 2,237,081 | Owens | Apr. 1, 1941 |
| 2,403,134 | Stephenson | July 2, 1946 |

FOREIGN PATENTS

| Number | Country | Date |
|---|---|---|
| 424,587 | Germany | Jan. 27, 1926 |